Patented July 13, 1954

2,683,707

UNITED STATES PATENT OFFICE 2,683,707

COMPLEX CHROMIUM COMPOUNDS OF MONOAZO-DYESTUFFS

Jakob Brassel, Basel, Switzerland, assignor to Ciba Limited, Basel, Switzerland, a Swiss firm No Drawing. Application January 28, 1952,
Serial No. 268,667

Claims priority, application Switzerland February 6, 1951

3 Claims. (Cl. 260—151)

According to this invention valuable new complex chromium compounds of monoazo-dyestuffs are made by treating a monoazo-dyestuff containing one or two sulfonic acid groups and corresponding to the general formula $R_1-N=N-R_2$ in which $R_1$ represents an aromatic radical of the benzene series containing a hydroxyl or alkoxy group in a position vicinal to the azo linkage, and $R_2$ represents the radical of a 1-hydroxy-8-halogen-naphthalene sulfonic acid bound in the 2-position to the azo linkage, with an agent yielding chromium in such manner that the resulting chromium complex of the ortho-ortho'-dihydroxy-monoazo-dyestuff contains one atom of chromium in complex union for each molecule of dyestuff.

The monoazo-dyestuffs corresponding to the above formula and used as starting materials in the present process can be made by coupling an ortho-hydroxy or advantageously an ortho-alkoxy-diazo compound of the benzene series with a 1-hydroxy-8-halogen naphthalene sulfonic acid capable of coupling in the 2-position. As diazo compounds of the above kind there come into consideration, for example, those which contain a single sulfonic acid group or advantageously those which are free from sulfonic acid groups. Apart from the sulfonic acid group the diazo compounds may contain any desired further substituents such, for example, as nitro groups, straight or branched chain alkyl groups (such as lower alkyl groups which contain at most 6 carbon atoms, for example methyl, tertiary amyl or secondary butyl) alkoxy groups (especially those containing a few, advantageously at most four, carbon atoms such as a methoxy group), halogen atoms such as bromine or fluorine and especially chlorine, —CO-alkyl groups (such as the —COCH₃ group), and substituted or unsubstituted sulfonic acid amide or sulfone groups (such as the —SO₂—CH₃ group).

As diazo compounds containing a sulfonic acid group there may be mentioned those obtainable from the following amines: 4-chloro-2-amino-1-hydroxybenzene-6-sulfonic acid, 2-amino-1-hydroxybenzene-4-sulfonic acid, or 2-amino-1-methoxybenzene-4- or -5-sulfonic acid.

However, especially suitable monoazo dyestuffs are obtained with diazo compounds which are free from sulfonic acid groups, such as the diazo compounds of the following amines: 2-amino-4-, -5- or -6-nitro-1-hydroxybenzene, 2-amino-4-chloro-1 - hydroxybenzene, 2 - amino - 4 - methyl - 1-hydroxybenzene, 4-methyl-5- -6-nitro-2-amino-1-hydroxybenzene, 4-chloro-5- or -6-nitro-2-amino - 1 - hydroxybenzene, 4 - nitro - 6 - chloro-2-amino-1-hydroxybenzene, 2-amino-1-hydroxybenzene-4-sulfonic acid amide, 2-amino-1-hydroxy-benzene-4-sulfonic acid methylamide, 4:6-dinitro-2-amino-1-hydroxybenzene, 4-methoxy-2 - amino - 1 - hydroxybenzene, 4:6 - dichloro - 2-amino-1-hydroxybenzene, 3:4:5:6-tetrachloro-2-amino-1-hydroxybenzene, further 2-amino-1-methoxybenzene, 4-chloro-2-amino-1-methoxybenzene, 2-amino-1-methoxybenzene-4-sulfonic acid amide, 2-amino-1:4-dimethoxybenzene, 5-chloro-2-amino-1:4-dimethoxybenzene, 5-nitro-2-amino-1-methoxy-4-ethoxybenzene, 2-amino-1:4 - diethoxybenzene, 2 - amino - 1 - methoxy-4 - butyloxybenzene, 5 - chloro-2-amino-1:4-diethoxybenzene, 2-amino-1:4-dimethoxybenzene-5-sulfonic acid amide, 2-amino-1:4-dimethoxybenzene-5-sulfonic acid-N-methyl-, -ethyl- or isopropylamide, 2-amino-1:4-dimethoxybenzene-5-sulfonic acid morpholide, 2-amino-1:4-dimethoxybenzene-5 - ethyl - sulfone, 2 - amino - 1:4-dimethoxybenzene-5-benzyl-sulfone.

The coupling components to be coupled with the aforesaid diazo compounds to form the monoazo-dyestuffs are 1-hydroxy-8-halogen-naphthalene sulfonic acids which contain one or two sulfonic acid groups. The halogen atom in the 8-position may be for example, a fluorine or bromine atom or above all a chlorine atom.

When there are used as coupling components 1 - hydroxy - 8 - halogen - naphthalene disulfonic acids, for example, 1-hydroxy-8-bromonaphthalene-3:6-disulfonic acid, 1-hydroxy-8-chloronaphthalene-3:5- or -3:6- or -5:7-disulfonic acid, diazo compounds that are free from sulfonic acid groups must be used, whereas when a 1-hydroxy-8-halogen-naphthalene monosulfonic acid, for example, 1-hydroxy-8-chloronaphthalene-3- or -5-sulfonic acid, is used the diazo component may contain one sulfonic acid group.

The coupling of the diazo compound, prepared in the usual manner, with 1-hydroxy-8-halogen-naphthalene sulfonic acids is advantageously conducted in an alkaline medium. If desired the coupling may also be conducted in the presence of a suitable addition, such as alcohol or pyridine.

The monoazo-dyestuffs used as starting materials in the present process may, if desired, be isolated from the coupling mixture and freed from impurities. In general, however, the coupling mixture may be treated as such with an agent yielding chromium, that is to say without the intermediate isolation of the dyestuff. In this case it is usually necessary, prior to carrying out the reaction with the agent yielding chromium, to adjust the coupling mixture to a pH value favorable for that reaction, for example, to give the mixture a weakly mineral acid reaction.

The treatment with the agent yielding chromium may be carried out, for example, by methods which are known to lead to chromium compounds containing one atom of chromium per molecule of dyestuff. The treatment may be carried out, for example, with a salt of trivalent chromium, such as chromium fluoride, chromium sulfate or chromium formate in an aqueous medium, which is advantageously rendered acid with a mineral acid, at a raised temperature and, in the case of the ortho:ortho'-dihydroxy-azo-dyestuffs, under atmospheric pressure at the boiling temperature of the reaction mixture, or in some cases advantageously at a higher temperature, for example, at a temperature within the range of 110–150° C. and under superatmospheric pressure, and, in the case of ortho-alkoxy-ortho'-hydroxy-azo-dyestuffs the last mentioned conditions of treatment are usually recommended.

The chromiferous monoazo-dyestuffs of the invention are new. They are chromium compounds, which contain one or two sulfonic acid groups and one atom of chromium bound in complex union per molecule of dyestuff, of monoazo-dyestuffs corresponding to the formula

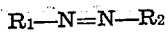

$$R_1-N=N-R_2$$

in which $R_1$ represents an aromatic radical of the benzene series containing a hydroxyl group in a position vicinal to the azo linkage, and $R_2$ represents the radical of a 1-hydroxy-8-halogen-naphthalene sulfonic acid bound in the 2-position to the azo linkage.

These products are suitable for dyeing or printing a very wide variety of materials, but more especially materials of animal origin, such as silk, leather and above all wool. They can also be used for dyeing artificial fibers of superpolyamides or superpolyurethanes. The dyeings so obtained are in general distinguished by good properties of fastness and by their especially pure tints, the purity of which is maintained when they are viewed in artificial light.

The following examples illustrate the invention, the parts and percentages being by weight unless otherwise stated and the relationship of parts by weight to parts by volume being the same as that of the kilogram to the liter.

Example 1

12.3 parts of 2-methoxy-1-aminobenzene are diazotized in the usual manner with 7 parts of sodium nitrite in the presence of 30 parts of hydrochloric acid of 30 per cent. strength. The solution of the diazo compound is run while stirring well into a solution cooled to 0° C. of 37 parts of 8-chloro-1-hydroxynaphthalene-3:6-disulfonic acid and 40 parts of anhydrous sodium carbonate in 400 parts of water. The resulting dyestuff precipitates for the greater part and is separated by filtration. When dry it is a dark colored substance, which dissolves in dilute sodium carbonate solution with a red coloration and in concentrated sulfuric acid with a dichroic red-violet coloration, and dyes wool from an acid bath red tints.

This dyestuff can be converted into the complex chromium compound advantageously without previous drying. For this purpose the dyestuff paste obtained as described above is stirred with 1000 parts of hot water and sulfuric acid of 10 per cent. strength is added and the reaction is weakly acid with mineral acid. After the addition of a quantity of chromium sulfate [Cr(OH)SO$_4$] containing 5.7 parts of chromium, the reaction mixture is heated in a lead-lined autoclave fitted with stirring mechanism at 130–135° C., and stirring is carried on for 20 hours at that temperature. The reaction mixture is filtered while hot to remove a small amount of impurities. The resulting chromium compound is precipitated from the filtrate by the addition of sodium chloride, and separated by filtration and washed with a saturated solution of sodium chloride. When dry, the dyestuff is a dark colored substance, which dissolves in dilute sodium carbonate solution and in concentrated sulfuric acid with a violet coloration, and dyes wool from a sulfuric acid bath fast blue-violet tints.

By using, instead of 12.3 parts of 2-methoxy-1-aminobenzene, 19.3 parts of 5-tertiary-amyl-2-methoxy-1-aminobenzene or 15.8 parts of 5-chloro-2-methoxy-1-aminobenzene, or 18.8 parts of 2:5-dimethoxy-4-chloro-1-aminobenzene, and otherwise proceeding in the manner described above, chromiferous dyestuffs are obtained having similar properties and which dye wool fast reddish blue tints.

A chromiferous dyestuff having similar properties, which dyes wool from a sulfuric acid bath violet tints, is obtained by using, instead of 12.3 parts of 2-methoxy-1-aminobenzene, 20.2 parts of 2-methoxy-1-aminobenzene-5-sulfonic acid amide and otherwise proceeding in the manner described above. The chromium compounds, advantageously after concentrating the reaction mixture to about 300 parts by volume, is precipitated by the addition of sodium chloride.

A dyestuff having similar properties, which dyes wool from a sulfuric acid bath pure blue tints, is obtained by using instead of 12.3 parts of 2-methoxy-1-aminobenzene, 23.2 parts of 2:5-dimethoxy-1-aminobenzene-4-sulfonic acid amide and otherwise proceeding in the manner described above. After concentrating the reaction mixture to about 200 parts by volume, the chromium compound is precipitated by the addition of sodium chloride.

Example 2

16.8 parts of 4-nitro-2-methoxy-1-aminobenzene are diazotized in the usual manner with 7 parts of sodium nitrite in the presence of 57 parts of hydrochloric acid of 30 per cent. strength. The solution of the diazo compound is run, while stirring, into a solution, cooled to 10° C., of 37 parts of 8-chloro-1-hydroxynaphthalene-3:6-disulfonic acid and 40 parts of anhydrous sodium carbonate in 400 parts of water. The resulting dyestuff precipitates for the greater part and is separated by filtration. There is obtained a dark colored substance, which dissolves in dilute sodium carbonate solution with a red coloration and in concentrated sulfuric acid with a red-violet coloration, and dyes wool from an acid bath bluish-red tints.

It is of advantage to convert the dyestuff into the complex chromium compound without previous drying. For this purpose the dyestuff paste obtained as described above is stirred with 1000 parts of hot water and sulfuric acid of 10 per cent. strength is added until the reaction is weakly acid with mineral acid. After adding a quantity of chromium sulfate [Cr(OH)SO$_4$] containing 5.7 parts of chromium, the reaction mixture is heated in a lead-lined autoclave having stirring mechanism at 130–135° C. and stirred for 20 hours at that temperature. The sparingly soluble chromium compound is separated by filtering the mixture while hot, and is then dissolved in 200 parts of hot water with the addition of 3.2 parts of sodium hydroxide. The whole is filtered to remove any impurities which may be present, and the filtrate is neutralized with about 9.2 parts of hydrochloric acid of 30 per cent. strength. The chromium compound is precipitated by the addition of sodium chloride. When dry the dyestuff is a dark colored substance, which dissolves in dilute sodium carbonate solution and in concentrated sulfuric acid with a reddish blue coloration, and dyes wool from a sulfuric acid bath fast blue tints.

*Example 3*

30.2 parts of 2:5-dimethoxy-1-aminobenzene-4-sulfonic acid morpholide are diazotized in the usual manner with 7 parts of sodium nitrite in the presence of 46 parts of hydrochloric acid of 30 per cent. strength. The solution of the diazo compound is run while stirring into the solution, cooled to 10° C., of 37 parts of 8-chloro-1-hydroxybenzene-3:5-disulfonic acid and 40 parts of anhydrous sodium carbonate in 400 parts of water. The resulting dyestuff is precipitated by the addition of sodium chloride and separated by filtration. When dry, it is a dark colored substance, which dissolves in dilute sodium carbonate solution with a red coloration and in concentrated sulfuric acid with a blue coloration, and dyes wool from an acid bath red tints.

It is of advantage to convert this dyestuff into the complex chromium compound without previous drying. For this purpose the dyestuff paste obtained as described above is stirred with 1000 parts of hot water and sulfuric acid of 10 per cent. strength is added until the reaction is weakly acid with mineral acid. After the addition of a quantity of chromium sulfate solution [Cr(OH)SO₄] containing 5.7 parts of chromium, the reaction mixture is heated in a lead-lined autoclave fitted with stirring mechanism at 133–136° C. and stirring is carried on at that temperature for 20 hours. If necessary, the reaction mixture is filtered while hot to remove undissolved impurities. The chromiferous compound, advantageously after concentrating the filtrate to about 400 parts by volume, is separated by the addition of sodium chloride. When dry, the dyestuff is a dark colored substance which dissolves in dilute sodium carbonate solution with a blue coloration and in concentrated sulfuric acid with a dichroic red-blue coloration, and dyes wool from sulfuric acid baths fast blue tints.

*Example 4*

27.4 parts of 2:5-dimethoxy-1-aminobenzene-4-sulfonic acid isopropylamide are diazotized in the usual manner with 7 parts of sodium nitrite in the presence of 69 parts of hydrochloric acid of 30 per cent. strength. The solution of the diazo compound is run, while stirring, into a solution, cooled to 10° C., of 42 parts of 8-bromo-1-hydroxynaphthalene-3:6-disulfonic acid and 60 parts of anhydrous sodium carbonate in 400 parts of water. The resulting dyestuff is precipitated by the addition of 65 parts of hydrochloric acid of 30 per cent. strength and 100 parts of sodium chloride. When dry, it is a dark colored substance which dissolves in dilute sodium carbonate solution with a red coloration and in concentrated sulfuric acid with a blue coloration, and dyes wool from acid baths red tints.

The resulting dyestuff is converted into the complex chromium compound advantageously without previous drying. For this purpose the dyestuff paste obtained as described above is stirred with 1000 parts of hot water and sulfuric acid of 10 per cent. strength is added until the reaction is weakly acid to mineral acid. After the addition of a quantity of chromium sulfate

[Cr(OH)SO₄]

containing 5.7 parts of chromium, the reaction mixture is heated in a lead-lined autoclave fitted with stirring mechanism at 120–125° C. and stirring is carried on at that temperature for 20 hours. The sparingly soluble chromium compound is separated by filtration while hot, and then dissolved in 100 parts of hot water with the addition of 2 parts of sodium hydroxide. After the addition of 30 parts of sodium chloride, the dyestuff solution is neutralized with hydrochloric acid of 30 per cent. strength. Precipitation of the dyestuff is brought about by heating the solution at 80–90° C. When dry, the dyestuff is a dark colored substance which dissolves in dilute sodium carbonate solution with a blue coloration and in concentrated sulfuric acid with a dichroic red-blue coloration, and dyes wool from sulfuric acid baths fast pure blue tints.

*Example 5*

41 parts of the monoazo-dyestuff, obtained by coupling diazotized 4-chloro-2-amino-1-hydroxybenzene with 8-chloro-1-hydroxynaphthalene-5-sulfonic acid, are stirred with 2500 parts of hot water, and then sulfuric acid is added until the reaction is weakly acid with mineral acid. After the addition of a quantity of chromium sulfate [Cr₂(SO₄)₃] containing 5.7 parts of chromium, the reaction mixture is heated in a lead-lined autoclave fitted with stirring mechanism at 115–118° C. and the whole is stirred at that temperature for 20 hours. After the addition of 250 parts of sodium chloride the precipitated dyestuff is separated by filtration and dissolved in 1000 parts of water at 60° C. after the addition of 6 parts of sodium hydroxide. If necessary, the whole is filtered to remove undissolved impurities. The chromium compound of the dyestuff is precipitated from the filtrate by the addition of 16 parts of acetic acid of 50 per cent. strength and 150 parts of sodium chloride, and separated by filtration. When dry, the dyestuff is a dark colored substance which dissolves in dilute sodium carbonate solution with a violet red coloration and in concentrated sulfuric acid with a green coloration, and dyes wool from sulfuric acid baths fast reddish blue tints.

Chromiferous dyestuffs, which dye wool slightly less reddish blue tints and in other respects have similar properties, are obtained by starting from a dyestuff obtained from 4:6-dichloro-2-amino-1-hydroxybenzene- or 3:4:5:6-tetrachloro-2-amino-1-hydroxybenzene, instead of 4-chloro-2-amino-1-hydroxybenzene, and otherwise proceeding in the manner described above.

*Example 6*

49 parts of the monoazo-dyestuff obtained by coupling diazotized 4-chloro-2-amino-1-hydroxybenzene with 8-chloro-1-hydroxynaphthalene-3:6-disulfonic acid, are stirred in 1000 parts of hot water, and then sulfuric acid of 10 per cent. strength is added until the reaction is weakly acid with mineral acid. After the addition of a quantity of chromium sulfate [$Cr_2(SO_4)_3$] containing 6.2 parts of chromium, the reaction mixture is boiled under reflux for 20–30 hours. If necessary, undissolved impurities are removed by filtration. The filtrate is mixed at the boiling temperature with 300 parts of sodium chloride. The whole is slowly cooled while stirring to room temperature.

The precipitated dyestuff is separated by filtration and washed with a saturated solution of sodium chloride. When dry, it is a dark colored substance which dissolves in dilute sodium carbonate solution with a red-violet coloration and in concentrated sulfuric acid with a dichroic blue-violet coloration, and dyes wool from sulfuric acid baths fast reddish blue tints.

*Example 7*

100 parts of well wetted wool are entered at 40° C. into a dyebath which contains 2 parts of the chromiferous dyestuff obtainable as described in the first two paragraphs of Example 1, 40 parts of sulfuric acid of 10 per cent. strength and 3000 parts of water, and the bath is slowly heated to the boil. After boiling for ¼ hour a further 40 parts of sulfuric acid of 10 per cent. strength are added, and dyeing is continued at the boil for 1½ hours. The wool is then rinsed with cold water and dried. It is dyed a blue-violet tint.

What is claimed is:

1. A chromium compound containing one atom of chromium in complex union with one molecular proportion of a monoazo dyestuff which, as free acid, corresponds to the formula

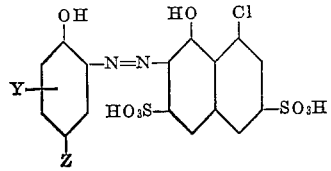

wherein Y represents a member selected from the group consisting of a hydrogen atom, a chlorine atom, a nitro group and a sulfonic acid-amide group, and Z represents a lower alkoxy group.

2. The chromium compound containing a chromium atom in complex combination with one molecular proportion of the monoazo dyestuff which, as free acid, corresponds to the formula

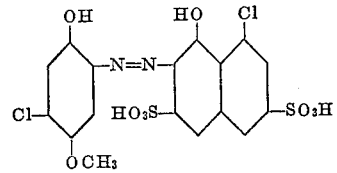

3. The chromium compound containing a chromium atom in complex combination with one molecular proportion of the monoazo dyestuff which, as free acid, corresponds to the formula

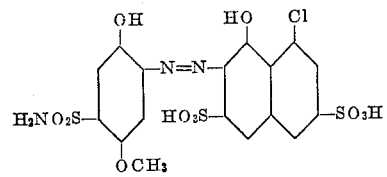

References Cited in the file of this patent

UNITED STATES PATENTS

| Number | Name | Date |
| --- | --- | --- |
| 1,408,296 | Herzberg et al. | Feb. 28, 1922 |
| 1,947,945 | Lange | Feb. 20, 1934 |
| 2,109,806 | Straub et al. | Mar. 1, 1938 |
| 2,178,054 | Straub et al. | Oct. 31, 1939 |
| 2,218,986 | Hoffmann et al. | Oct. 22, 1940 |
| 2,418,416 | Locke | Apr. 1, 1947 |

FOREIGN PATENTS

| Number | Country | Date |
| --- | --- | --- |
| 9,441 | Great Britain | of 1894 |
| 517,473 | France | Dec. 17, 1920 |